(12) United States Patent
Murasaki

(10) Patent No.: US 6,209,177 B1
(45) Date of Patent: Apr. 3, 2001

(54) MOLDED SURFACE FASTENER, AND MOLDING METHOD AND MOLDING APPARATUS OF THE SAME

(75) Inventor: Ryuichi Murasaki, Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/235,008

(22) Filed: Jan. 21, 1999

(30) Foreign Application Priority Data

Jan. 22, 1998 (JP) .................................................. 10-010498

(51) Int. Cl.[7] .................................................. A44B 18/00
(52) U.S. Cl. .................................. 24/452; 24/442; 24/447; 24/450
(58) Field of Search .............................. 24/452, 450, 447, 24/448, 444, 442

(56) References Cited

U.S. PATENT DOCUMENTS

| | | |
|---|---|---|
| 3,932,090 | 1/1976 | Brumlik . |
| 4,419,315 | 12/1983 | Kessler . |
| 5,067,210 * | 11/1991 | Kayaki .................................. 24/452 |
| 5,240,663 | 8/1993 | Stringaro et al. . |
| 5,604,963 * | 2/1997 | Akeno .................................. 24/452 |
| 5,749,129 * | 5/1998 | Murasaki et al. ...................... 24/442 |
| 5,755,015 * | 5/1998 | Akeno et al. ........................ 24/442 |
| 5,781,969 * | 7/1998 | Akeno et al. ........................ 24/442 |
| 5,951,931 * | 9/1999 | Murasaki et al. ...................... 24/452 |

FOREIGN PATENT DOCUMENTS

| | | |
|---|---|---|
| 0 711 518 | 5/1996 | (EP) . |
| 0 811 332 | 12/1997 | (EP) . |
| 2 017 685 | 5/1970 | (FR) . |
| 0 709 038 | 5/1996 | (FR) . |

* cited by examiner

*Primary Examiner*—Victor N. Sakran
(74) *Attorney, Agent, or Firm*—Finnegan, Henderson, Farabow, Garrett & Dunner, LLP

(57) ABSTRACT

Molten resin material is continuously extruded from an extruding hole including a plurality of engaging-element-molding portions disposed with a constant pitch in a width direction of an extruding nozzle and a substrate-molding portion with which lower ends of the engaging-element-molding portions communicate. An ascending/descending member disposed at a front face of the extruding nozzle and made of a laterally long plank ascends and descends to vertically open and close the extruding hole of the extruding nozzle. As a result of such continuous molding, a surface fastener is continuously molded in which each of plurality engaging elements has stem and an engaging extruding head projecting at least toward one side from an end of the stem standing on a surface of a flat substrate. The engaging element thus molded has a thickness, in a direction perpendicular to a projecting direction of the engaging head, gradually increasing from a top portion of the engaging head to a base end of the stem. With such engaging elements that can be molded with a not conventional but new shape in various sizes, and its molding method and apparatus, maintenance and management are easy and productivity is high.

5 Claims, 10 Drawing Sheets

MOLDED SURFACE FASTENER, AND MOLDING METHOD AND MOLDING APPARATUS OF THE SAME

BACKGROUND OF THE INVENTION

1. Field of the Invention

The present invention relates to a molded surface fastener made of thermoplastic synthetic resin material and having engaging elements molded integrally with a surface of a flat substrate and independently of each other, and specifically, to a molded surface fastener which can be molded in various sizes, ranging from a fine size to a normal size, which is suitable for various usage in many fields, and which can be molded continuously and efficiently through a single step by using a simple apparatus. This invention also relates to a molding method and a molding apparatus of the same molded surface fastener.

2. Description of the Related Art

Conventional molded surface fastener is produced by various methods. A typical example is a method for producing a surface fastener by complete batch process by injection molding. Another typical method is a process for molding engaging elements successively and integrally with a flat substrate by rotating in one direction a die wheel having on its peripheral face a large number of cavities for molding the engaging elements and continuously introducing molten resin material into the peripheral face of the die wheel. By these methods, various conventionally and widely known shapes of engaging elements such as a palm shape and a hook shape can be molded.

Furthermore, another know method employs an extrusion die in which a large number of substantially T-shaped extruding openings are arranged side by side and have lower ends communicating with each other. By extruding molten resin simultaneously through the extruding openings, a plurality of ribs which are substantially T-shaped in section are successively molded on a surface of a flat substrate. Then, the molten resin molded material is hardened by cooling. Thereafter, the ribs are successively cut in a perpendicular direction or in a direction with an appropriate inclination angle with respect to a horizontal plane where the ribs are arranged such that each of the cut ribs have a predetermined thickness. At this time, the flat substrate is left uncut. After the cutting process, the flat substrate is drawn in a direction of molding, until the cut engaging elements are separated from each other with a desired pitch, thereby producing the molded surface fastener.

According to the above molding methods, the shape or the size of the engaging elements is limited, if their productivity is high, while a continuous molding is difficult to achieve or a number of processes increases so that the productivity is decreased, if the shape or the size of the engaging elements is optional to some extent. Both the cases have extreme advantages and disadvantages.

Particularly, in the above process wherein the ribs of the molten resin molded material having ribs extruded from the extrusion die to the surface of the flat substrate are cut and the substrate is drawn, a sectional shape of an engaging head of each engaging element can be optical to some extent. However, three steps, i.e., an extrusion molding, cutting of ribs, and drawing are required. Specifically, a high processing accuracy is required especially to cut the ribs, so that maintenance and management for this purpose requires considerable workload and time.

SUMMARY OF THE INVENTION

The present invention has been accomplished to solve the above problems, and specifically, it is an object of the invention to provide a molded surface fastener which can be continuously molded by an entirely new molding mechanism and which has engaging elements molded to have new shapes which are not conventional and of various sizes so that maintenance and management can be easy to achieve and a productivity is high. It is also an object of the invention to provide a molding process and a molding apparatus of the molded surface fastener.

The above object is achieved by the invention stated below.

According to a first aspect of the present invention, there is provided a molded surface fastener comprising a flat substrate and a large number of engaging elements integrally molded with substrate, wherein each of the engaging elements has a stem standing on a surface of the flat substrate and an engaging head projecting from an end of the stem toward at least one side thereof, a thickness of each of the engaging elements in a direction perpendicular to a projecting direction of the engaging head gradually increasing from a top of the engaging head to a base end of the stem.

With the molded surface fastener of the present invention having the above shape, the engaging elements do not easily fall due to a force (shearing force) in a direction parallel to the surface of the flat substrate or an urging force from above in a oblique direction with respect to the substrate. Also, when the loops which are companion engaging elements are pulled obliquely upward in an engaged state with the stems, the loops are necessarily guided to boundary areas between the stems and the engaging heads, thereby preventing rising of the engaging heads in the loops and preventing the loops from being easily detached from the stems. On the other hand, because a thickness of each engaging head in a direction perpendicular to the projecting direction thereof is formed to gradually increase from its top portion to its end portion, the engaging elements can easily enter a group of the opposed loops, and further each engaging element can spread each loop sideways at the time of entering. Therefore, although the width of the engaging head gradually increases toward its projecting end, the engaging head can be easily inserted into the loop. Further, the engaged companion loop is not easily detached due to a gouged shape of a neck portion of the engaging element which is a boundary between the engaging head and the stem thereof, as compared with the conventional molded surface fastener wherein the width of the engaging head is constant in the direction, thereby increasing an engaging rate, an engaging force, and a peeling force.

According to the present invention, the engaging head may project in a direction perpendicular to a molding direction of the molded surface fastener. Because the surface fastener of this shape can be continuously molded by a manufacturing process and a manufacturing apparatus, which will be described later, without producing a specially shaped molding die for engaging elements with a special shape. Therefore, a productivity is remarkably increased.

According to the present invention, it is preferable that the flat substrate has recessed grooves which extend continuously in a direction perpendicular to a projecting direction of the engaging head between the engaging elements which are adjacent to each other in the projecting direction of the engaging head.

Alternatively, the flat substrate has recessed grooves which extend continuously in a projecting direction of the engaging head between the engaging elements which are adjacent to each other in a direction perpendicular to the projecting direction of the engaging head.

The above two types of the recessed grooves may be formed to be perpendicular to each other.

By forming the recessed grooves in the surface of the substrate, an apparent thickness of the flat substrate can be decreased so that flexibility of the surface fastener can be increased and generation of a crack in the substrate between the adjacent engaging elements can be prevented. Furthermore, because side wall faces of the recessed grooves can function as guide faces for guiding the companion loops to the rising base portion of the engaging elements, the engaging rate of the engaging elements with the companion loops can be increased.

According to the present invention, an end of the engaging head faces a surface of the flat substrate. With this shape, in addition to the above-described functions and effects, even if the engaged companion loops are pulled upward, the loops are not easily detached from the engaging heads, thereby further increasing the engaging force as compared with a case where the engaging heads linearly project from the stems.

According to the present invention, it is preferable that a large number of the engaging elements are disposed in a large number of lines in a molding direction of the flat substrate and the engaging elements adjacent across the lines are disposed in a staggered manner. With this arrangement of the engaging elements, the engaging elements are engaged with companion loops not regularly but entirely at random, thereby remarkably improving the engaging rate.

The molded surface fasteners with the above shapes can be efficiently molded by the following molding process according to the present invention.

According to a second aspect of the present invention, there is provided a method for molding a surface fastener for integrally molding a flat substrate and a large number of engaging elements by continuous molding and comprising the steps of continuously extruding molten resin material from an extruding hole extending in a width direction of an extruding nozzle, and vertically opening and closing the extruding hole of the extruding nozzle by an ascending/descending member disposed in front of the extruding nozzle, wherein the extruding hole is in a unitary form comprising a plurality of engaging-element-molding portions disposed with a constant pitch in the width direction of the extruding nozzle and a substrate-molding portion with which lower ends of the engaging-element-molding portions communicate, the ascending/descending member is made of a laterally long plank, and at least a portion of the substrate-molding portion is open when the extruding hole is at a closed position.

With this method, the molded surface fasteners having the above shapes can be continuously produced by a single process so that a cost of manufacture per a unit can be reasonable. On the other hand, in order to produce the molded surface fastener similar in shape to the one of the conventional extrusion molding, a large number of ribs each having a T shape in cross section, which is to be formed to stand on the surface of the substrate, are cut in a longitudinal direction with a predetermined thickness, and then the substrate is drawn in the longitudinal direction. Because a plurality of manufacturing processes are required, the conventional extrusion molding is not efficient. Also, because longitudinal front and rear faces of the engaging elements of the produced molded surface fastener are cut, planes of the front and rear faces are parallel to each other. Therefore, as compared with the above shape of the engaging elements according to the present invention, it is natural that the conventional engaging elements are liable to fall in the front and rear direction, and the cost of manufacture per a unit is necessarily increased.

This molding method is carried out by a molding apparatus of the present invention having the following structures.

According to a third aspect of the present invention, there is provided an apparatus for molding a surface fastener for integrally molding a flat substrate and a large number of engaging elements by continuous molding and comprising an extruding nozzle having an extruding hole extending in a width direction thereof, an ascending/descending member disposed in front of the extruding nozzle for vertically opening and closing the extruding hole, and a driving means for vertically moving the ascending/descending member, wherein the extruding hole comprises a plurality of engaging-element-molding portions disposed with a constant pitch in the width direction of the extrusion nozzle and a substrate-molding portion with which lower ends of the engaging-element-molding portions communicate, the ascending/descending member is made of a laterally long plank, and at least a portion of the substrate-molding portion is open when the extruding hole is at a closed position.

In order to mold the surface fastener with the above shapes by using the molding apparatus of the invention having the above structure, molten resin extruded from an extruder is extruded from the extruding hole of the extruding nozzle. At this time, the ascending/descending member vertically reciprocates in a sliding contact with a front face of the extruding nozzle simultaneously with the extrusion. The descending-limit position of the ascending/descending member is at a position such that a thickness of the substrate is left below, for example. In other words, flat molten resin is constantly extruded from the substrate-molding portion of the extruding nozzle while the ascending/descending member ascends and descends to the descending-limit position, thereby successively molding the engaging elements at predetermined intervals and integrally with an upper face of the flat substrate.

Specifically, when a lower end of the ascending/descending member reaches to its the descending-limit position, i.e., to the upper face of the flat substrate extruded continuously, the ascending/descending member starts to ascend to open the openings of the engaging-element-molding portions upward from the lower ends thereof. At this time, the molten resin is continuously extruded from a lower portion according to a degree of opening of the opening and along shapes of the openings. When the ascending/descending member reaches upper ends of the openings, substantially first halves of the engaging elements in the extruding direction are molded. Then, the ascending/descending member starts to descend to gradually closing the openings of the engaging-element-molding portions from the upper ends thereof, and second halves of the engaging elements are gradually molded from the top portions of the engaging heads to the rising base ends of the stems, reversely to the above molding of the first halves.

A front shape of each engaging element substantially conforms to a shape of the opening of the engaging-element-molding portion. On the other hand, side faces of the engaging element are in such a shape that a width in the molding direction increases from an upper end toward a lower end thereof. Furthermore, if a curve of an ascending/descending speed of the ascending/descending member is changed and controlled in various manners, front and back curved faces of the engaging element formed by the increasing width of the side faces of the engaging element in the molding direction can be changed in various manners. The shape of the side faces is determined according to the ascending/descending speed of the ascending/descending member.

Therefore, by only providing the ascending/descending member for vertically opening and closing the extruding hole and the driving means for vertically moving the ascending/descending member to a front face of the conventional extrusion molding apparatus of the molded surface fastener of this type, the surface fastener having such a shape of the engaging element and functions/effects that can not be anticipated in the above conventional molded surface fastener of this type can be obtained. Also, an efficient manufacture by a single step which can not be expected in the conventional process can be achieved.

According to the present invention, regardless of the ascending/descending member having such a simple structure, a most efficient and highly reliable driving means is provided. Specifically, the driving means comprises a crank mechanism connected through a link. Alternatively, the driving means is a cam driving mechanism having a cam mounted to a rotating shaft and a cam contact which abuts on the cam.

According to the present invention, because the extruding nozzle has first and second extruding holes disposed symmetrically and independently on upper and lower portions of the extruding nozzle, thereby doubling a productivity. Moreover, in general, there is a tendency for molten resin of an amount larger than a set value to be extruded in a moment at the time when the ascending/descending member starts to open the extruding hole and when a pressure of the resin at the extruding hole is high, which influences on a shape of a front face of the molded engaging elements. In the present embodiment, however, when either groups of the upper or lower engaging-element-molding portion starts to open, the other groups of engaging-element-molding portions start to close. Therefore, an opening rate of the extruding hole is constant, so that the resin pressure of the molten resin supply channel is always maintained at a constant value, and the shapes of front and rear portions of the engaging elements can be molded as previously set.

It is preferable that the ascending/descending member comprises first and second pectinate planks having opening portions formed in a longitudinal direction thereof so as to correspond to the engaging-element-molding portions of the first and second pectinate planks such that the opening portions do not overlap each other, and the first and second planks are disposed in the front and rear to face the extruding hole and alternately ascend and descend by the driving means. The surface fastener thus molded comprises a large number of engaging elements arranged in a staggered manner and standing integrally with the surface of the flat substrate, as shown in FIG. 10, thereby increasing an engaging rate of the engaging elements with the companion loops as mentioned above.

Specifically, in a molding apparatus for molding the engaging elements in the staggered manner, the first ascending/descending member is made of a flat plate, a nonopening portion of the second ascending/descending member is in such a shape that the non-opening portion fits into the opening portion of the first ascending/descending member, and a vertical length of the opening portion of the first ascending/descending member is substantially twice as large as that of the non-opening portion of the second ascending/descending member. Further, it is preferable that the adjacent engaging-element-molding portions of the extruding hole are alternately disposed in the front and rear, the opening portions of the first ascending/descending member are slidably fit on the engaging-element-molding portions that are projecting, and a non-opening portion of the second ascending/descending member are slidably in contact with front faces of the projecting engaging-element-molding portions.

Vibration speed may be changed at random. In this case, the shapes of the engaging elements arranged in the molding direction can be changed in the same direction. Also, at least one or more lines of a plurality of engaging-element-molding portions in a lateral direction perpendicular to the molding direction may be provided with a height and a shape different from those of the lines of the other engaging-element-molding portions. In this case, the plurality of molded engaging elements arranged in a width direction of the substrate surface have different heights or shapes. By changing the heights or shapes, it is possible to appropriately adjust the engaging strength, the engaging rate, the peeling strength, and the like.

DESCRIPTION OF THE EMBODIMENTS

Figure 1:
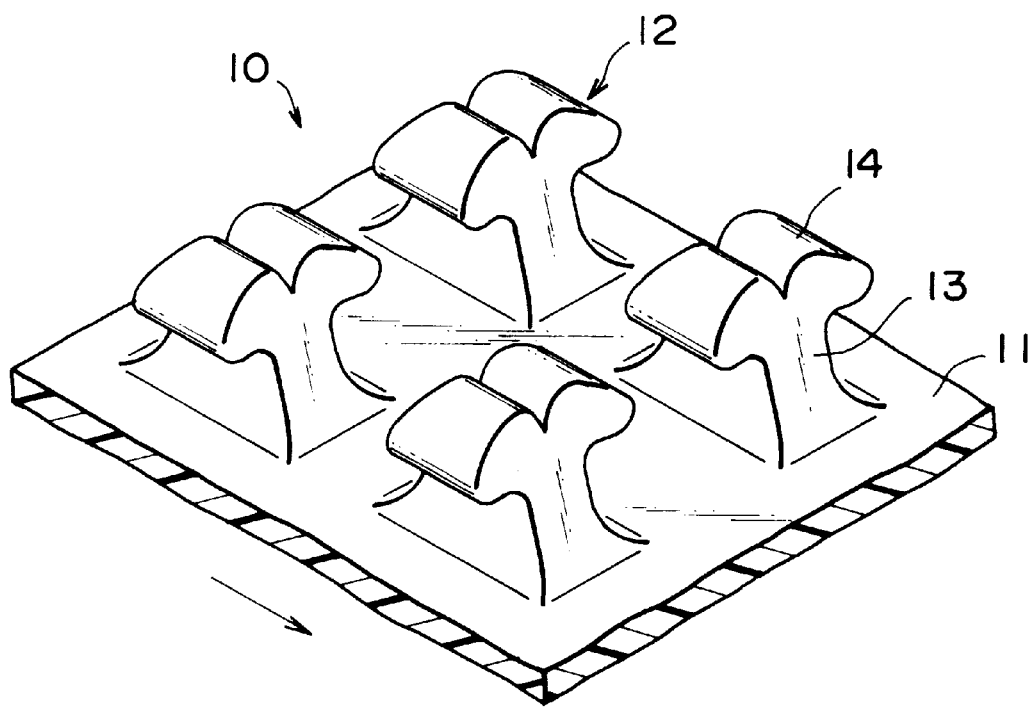
FIG. 1 is a fragmentary perspective view of a first example of a molded surface fastener according to the present invention.
Figure 2:
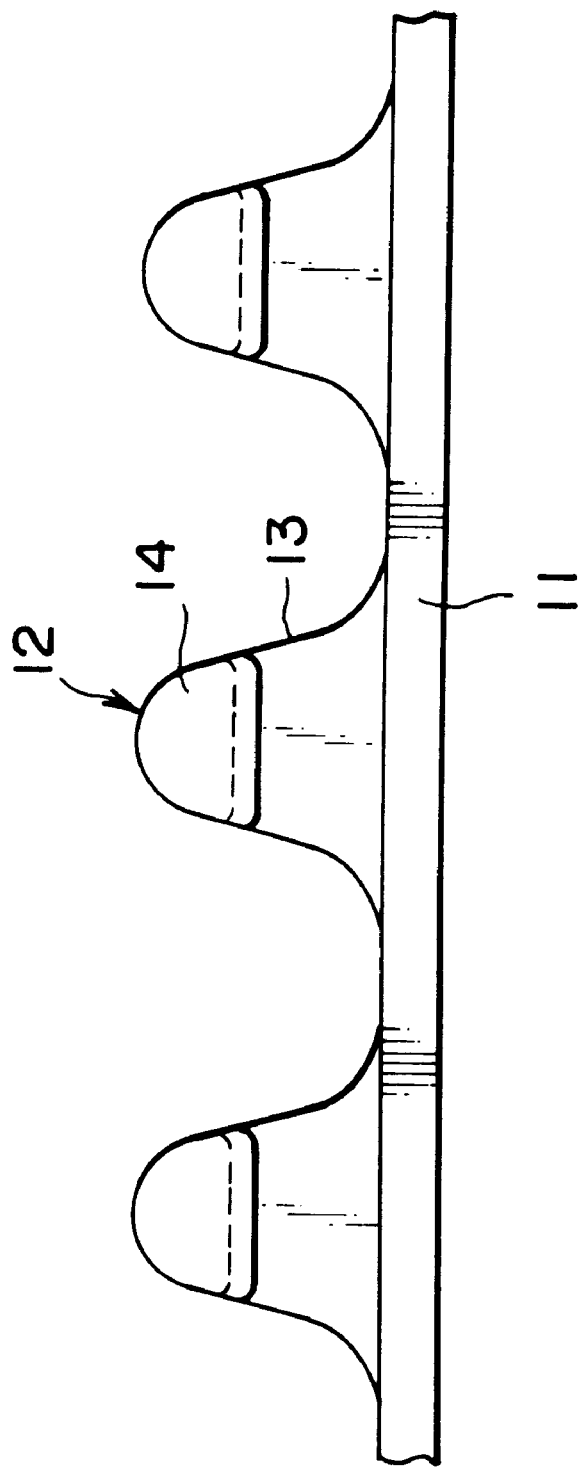
FIG. 2 is a side view of the molded surface fastener of FIG. 1.

Embodiments of the present invention will be described in detail below based on examples shown in the accompanying drawings. FIG. 1 is a fragmentary perspective view of a molded surface fastener having engaging elements, which are in a first typical shape and FIG. 2 is a side view of the same surface fastener. An arrow in FIG. 1 shows a direction of molding by a molding apparatus of the present invention.

As can be understood from FIGS. 1 and 2, a molded surface fastener 10 of the present invention can be easily produced by continuously and integrally molding a flat substrate 11 and a large number of engaging elements 12 standing on a surface of the substrate by a single process. Each of the engaging elements 12 comprises a stem 13 directly standing from the surface of the flat substrate 11 and an engaging head 14 projecting from an end of the stem 13 sideways in at least one direction. A thickness of the engaging element 12, which is perpendicular to a projecting direction of the engaging head 14 of the engaging element 12, gradually increases from a top portion of the engaging head 14 toward a rising base end of the stem 13.

As shown in FIGS. 1 and 2, the engaging element 12 of the present embodiment is formed into a substantially T shape with the top portion of the engaging head 14 is cut downward in a V-shape when seen from its front. A width of the stem 13 in a projecting direction of the engaging head 14 gradually decreases in a rising direction from the flat substrate 11 and extending in a constant width from a midway portion up to the engaging head 14. When the engaging element 12 is seen from a side, as shown in FIG. 2, a width of the engaging element 12 gradually increases from the top portion of the engaging head 14 toward the base portion of the stem 13 rising from the flat substrate 11. This gradually-increasing -width shape is employed not only in the stem 13 but also in the engaging head 14. A thickness of the engaging head, which is in a perpendicular direction to a projecting direction of the engaging head 14, gradually increases toward an end of the engaging head 14, and this gradually-increasing thickness can be arbitrarily set by changing an ascending/descending speed of an ascending/descending member 103 which will be described later.

The surface fastener with the above shape can be easily in a simple manner by a molding method and a molding apparatus of the present invention described below. According to the molding method, all the engaging elements 12 of the invention are molded independently of each other and integrally with the surface of the flat substrate 11. Also, as compared with engaging elements obtained by conventional cutting of ribs and drawing of substrate, an entire shape of each engaging element 12 is provided with roundness, thereby remarkably improving a touch of the engaging elements 12.

Because each engaging element 12 shown in FIGS. 1 and 2 is formed such that width dimensions of the stem 13 (in FIG. 1), both in a front-and-back direction and in a sideways direction, gradually increase toward the rising base portion, the stem 13 does not easily fall due to a force (shearing force) in parallel to the surface of the flat substrate 11 or an urging force from an obliquely upper direction of the substrate 11. Also, when a loop (not shown) as an companion engaging element is pulled obliquely upward while being engaged around the stem 13, the loop is necessarily guided to a boundary area between the stem 13 and the engaging head 14. Thus, the engaging head 14 does not rise in the loop, thereby preventing the loop from being easily detached from the engaging element 12. On the other hand, because the engaging head 14 also has a width, which is perpendicular to the projecting direction of the engaging head 14 (in FIG. 1), gradually increasing from its top to its end. With such a shape, the engaging elements 12 can easily enter an companion loop group. At this time, each engaging element 12 presses a companion loop and spreads the loop sideways. Therefore, the end of each engaging head 14 can be easily inserted into the companion loop. Also, because a neck portion which is the boundary portion between the stem 13 and the engaging head portion 14 is gouged, the companion engaged loop is further prevented from being easily detached from the engaging element 12, thereby increasing all of an engaging rate, an engaging force, and a peeling force, as compared with a conventional engaging element having a constant width in the same direction.

Figure 3:
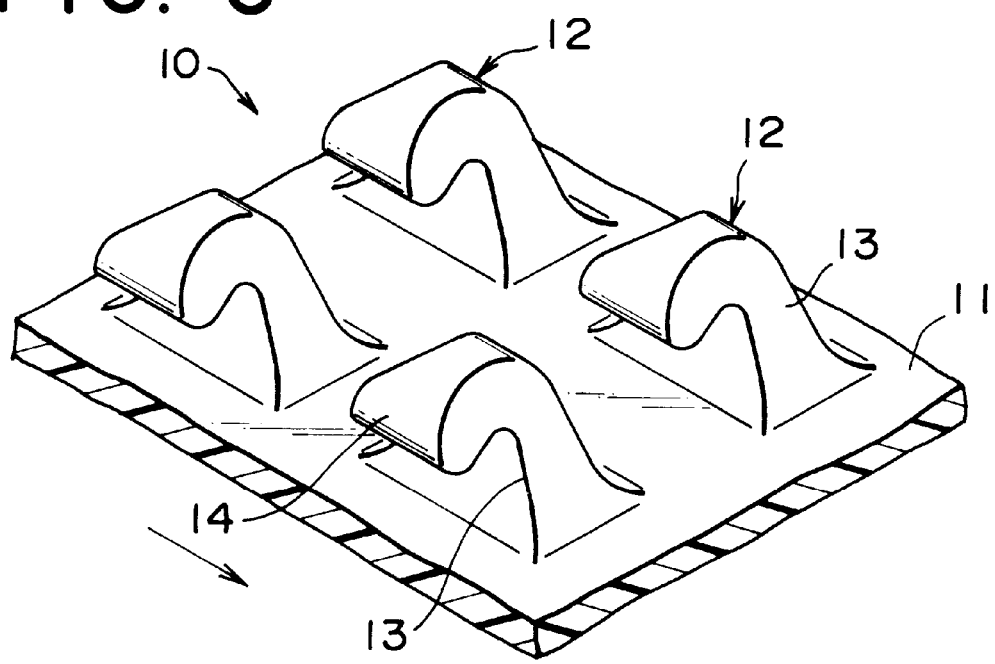
FIG. 3 is a fragmentary perspective view of a second example of a shape of the molded surface fastener according to the invention.

A second example of a shape of the engaging element shown in FIG. 3 is different from the above example in a shape of an engaging head 14. In other words, the engaging element 12 has only one engaging head 14. In FIG. 3, the engaging heads 14 project in either of left or right directions. This direction is determined by an opening shape of each of a plurality of engaging-element-molding portions 102a laterally arranged in an extruding hole 102 of an extruding nozzle 101, which will be described later. For example, by making the engaging heads 14 project to opposite directions to each other in each pair of adjacent engaging-element-molding portions 102a, the engaging elements 12 adjacent to each other in a direction perpendicular to a molding direction can have adjacent engaging heads 14 facing opposite directions to each other. It will be easily understood that this shape example also has the same functions and effects as those of the engaging elements of the previous example.

Figure 4:
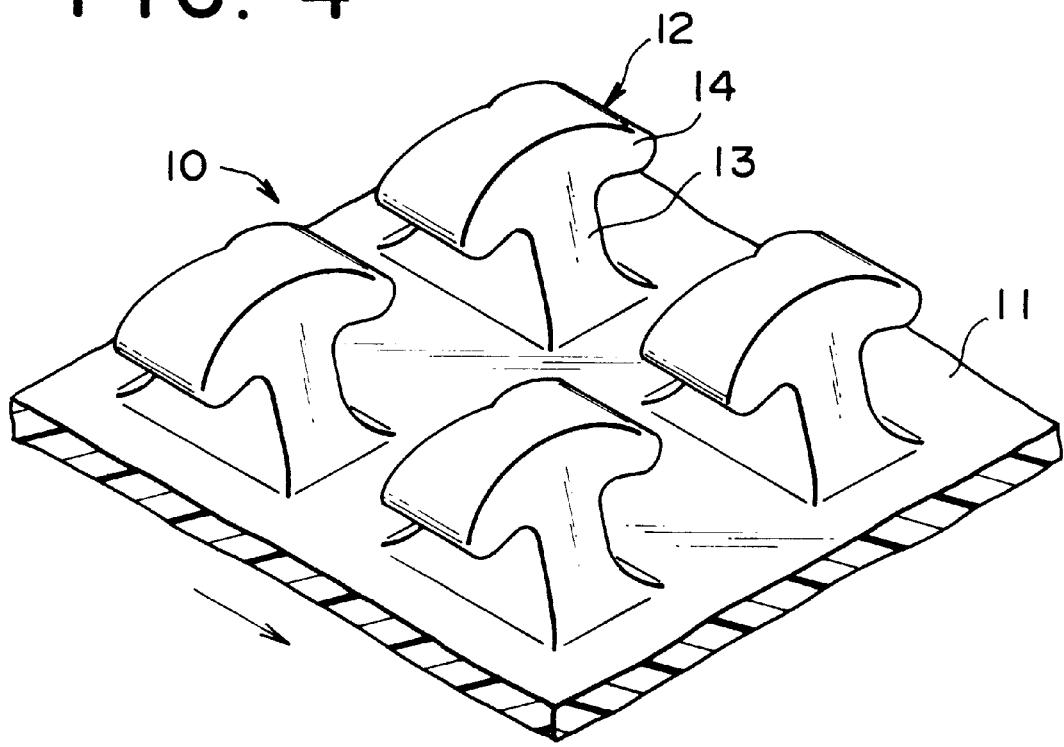
FIG. 4 is a fragmentary perspective view of a third example of a shape of the molded surface fastener according to the invention.

FIG. 4 shows a third example of a shape of the engaging element 12. This example is different from the above first shape example in that the top portion of the engaging heads 14 projecting left and right directions does not have its center cut downward into a V shape, but the top portion of the engaging head portion 14 is formed into a simple curved face. With this shape, in addition to the above functions and effects, even if the engaged companion loops are pulled upward, the left and right engaging heads 14 do not easily stand up, thereby further increasing the engaging force, as compared with the above first shape of the engaging elements 12.

Figure 5:
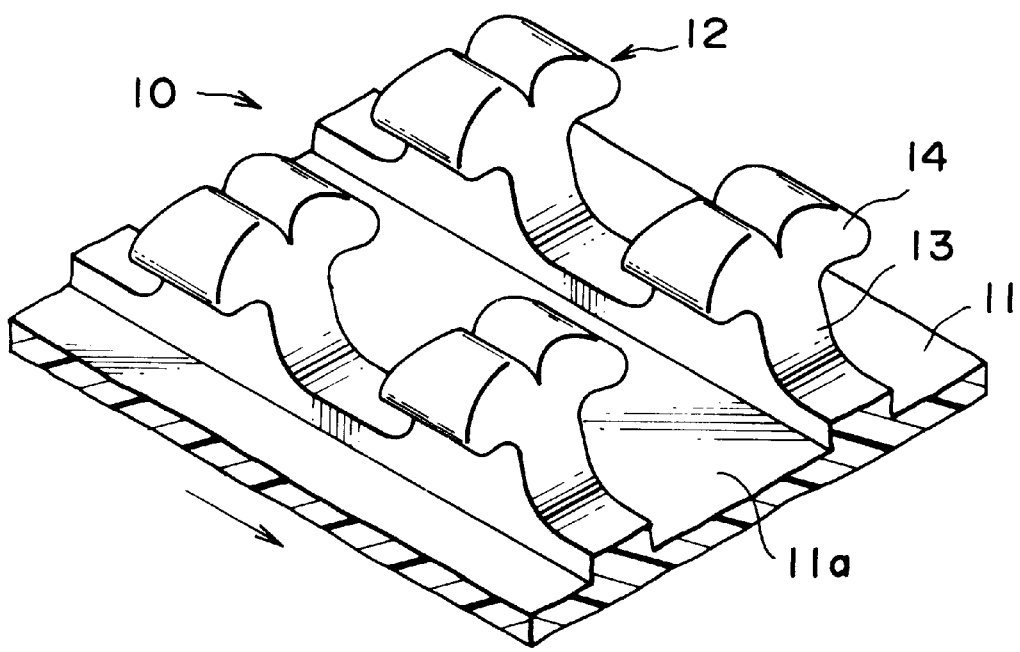
FIG. 5 is a fragmentary perspective view of a modification of the molded surface fastener according to the invention.
Figure 6:
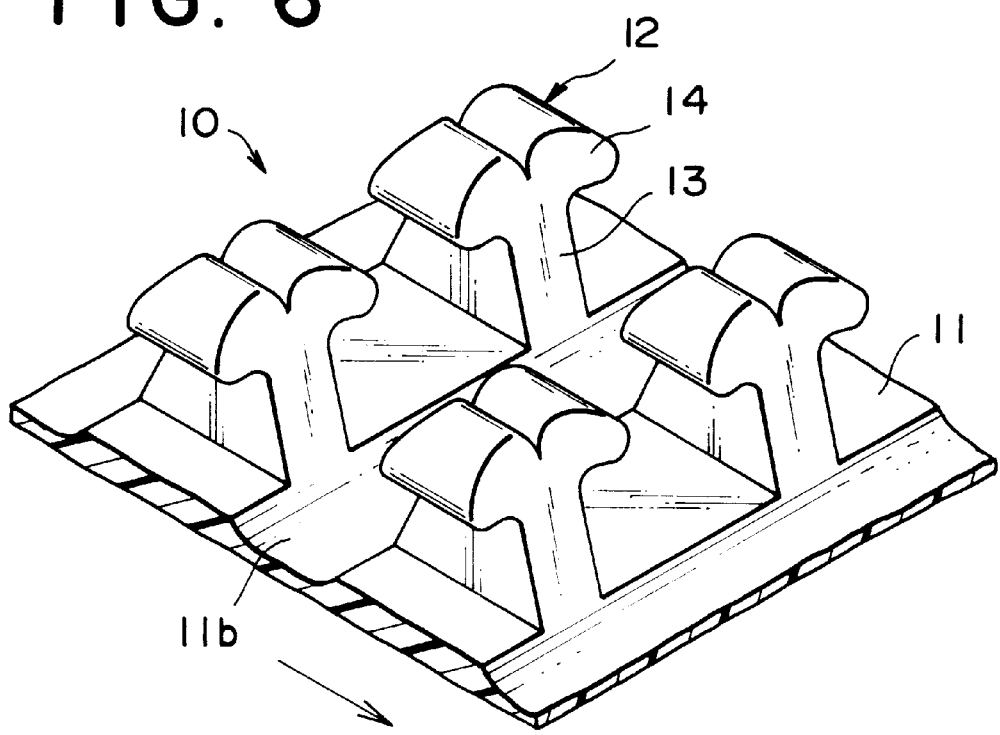
FIG. 6 is a fragmentary perspective view of another modification of the molded surface fastener according to the invention.

FIG. 5 shows a first modification of the molded surface fastener having the engaging elements 12 of the above first element shape. As shown in FIG. 5, the fastener comprises a large number of engaging elements 12 molded in lines on the surface of the flat substrate 11 and recessed grooves 11a continuously formed into a rectangular sectional shape on the surface of the flat substrate 11 between adjacent lines of the large number of molded engaging elements 12. FIG. 6 shows a second modification, wherein recessed grooves 11b having a bow-like sectional are formed in parallel to the projecting direction of the engaging heads 14 on the surface of the flat substrate 11 between adjacent front and rear lines of engaging elements 12. It is also possible to form latticed recessed grooves by combining the recessed grooves 11a and 11b.

By forming such recessed grooves 11a or 11b, an apparent thickness of the flat substrate 11 is decreased so that flexibility of the surface fastener can be increased and the substrate 11 is prevented from being easily torn between the adjacent engaging elements 12. Moreover, because each of side wall faces of the recessed grooves 11a and 11b each functions as a guide face for guiding a companion loop to the rising base portion of the engaging element 12, thereby increasing the engaging rate with the loops.

Figure 7:
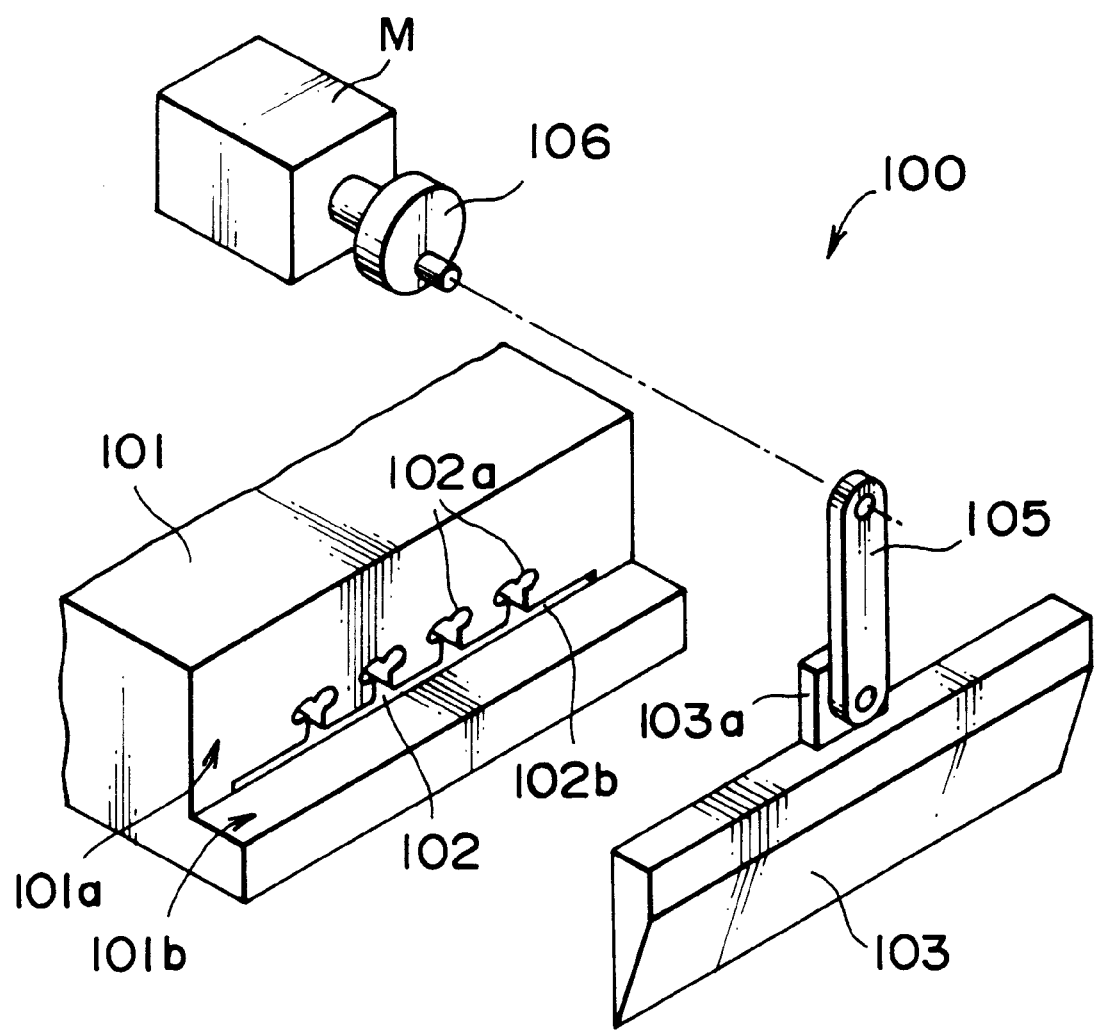
FIG. 7 is an exploded perspective view of en essential portion of a first embodiment of a molding apparatus of the surface fastener according to the invention.

The surface fastener with the above structures are efficiently produced by a molding apparatus 100 of the present invention shown in FIG. 7. FIG. 7 shows a first embodiment of the molding apparatus according to the present invention. In the molding apparatus of this type, because it is not largely different from a conventional structure, the extruder is not illustrated in FIG. 7 and its specific description is omitted here. In FIG. 7, a reference numeral 101 designates an extruding nozzle mounted to the extruder (not shown) and the extruding nozzle 101 has an extruding hole 102 communicating with an inside resin channel. A front end portion of the extruding nozzle 101 has a vertical face 101a and a horizontal face 101b horizontally extending forward from the vertical face 101a. The extruding hole 102 has a laterally long and narrow substrate-molding portion 102b along a lower end of the vertical face 101a for molding the flat substrate 11. Engaging-element-molding portions 102a for molding the engaging elements 12 open in the vertical face 101a with their lower ends communicating with the substrate-molding portion 102b.

The engaging-element-molding portions 102a comprise a plurality of openings which have lower ends communicating with the substrate-molding portion 102b and are laterally disposed with a predetermined pitch. A shape of the individual engaging-element-molding portion is the same as the first example of the shape of the engaging element seen from the front. In order to mold the stems 13 of the engaging elements 12 integrally with an upper face of the flat substrate 11, the lower ends of molding opening portions for the stems 13 communicate with the molding opening portion for the flat substrate 11. In the example shown in FIG. 7, the extruding nozzle 101 has four engaging-element-molding portions 102a. The horizontal face 101b of the extruding nozzle 101 constitutes a guide face for guiding amolded product (molded surface fastener) extruded from the extruding nozzle 101 forward.

In the present invention, an ascending/descending member 103 is disposed in contact with the vertical face 101a of the extruding nozzle 101. In the example shown in FIG. 7, the ascending/descending member 103 is made of a laterally long metal plank having a wedge-like sectional shape and has a flat face to abut on the vertical face 101a and a back face opposite to the flat face which inclines downward toward the flat face to intersect with the flat face at a lower end of the flat face. A bracket 103a projects from a center of an upper face of the ascending/descending member 103 and is connected through a link 105 to a crank shaft 106 which is connected to a rotation-driving source, such as an electric motor M as shown, for example Though it is omitted in FIG. 7, the apparatus includes sliding guide faces at left and right side edge portions of the vertical face 101a of the extruding nozzle 101 for allowing the ascending/descending member 103 to vertically reciprocate.

Next, it will be described how the molded surface fastener having the typical shape as shown in FIG. 1 are molded by the molding apparatus with the above structure. Molten resin extruded from the extruder (not shown) is extruded from the extruding hole 102 of the extruding nozzle 101 in a shape of the extruding hole 102. At this time, the ascending/descending member 103 vertically reciprocates in a sliding contact with a front face of the protruding nozzle 101 simultaneously with the extrusion of molten resin. According to the embodiment shown in FIG. 7, an ascending-limit position of the ascending/descending member 103 is at an upper end position of the engaging-element-molding portion 102a, i.e., an upper end position of the molding opening portions for the engaging heads 14. A descending-limit position of the ascending/descending member 103 is at a boundary position between the engaging-element-molding portions 102a and the substrate-molding portion 102b, i.e., an upper end position of the molding opening portion for the flat substrate 11.

Therefore, during extrusion molding, the molten resin in a flat shape is constantly extruded from the substrate-molding portion 102b of the extruding nozzle 102. By the ascending and descending movement of the ascending/descending member 103, the engaging elements 12 are successively molded in lines with a predetermined pitch and integrally with the upper face of the flat substrate. This will be described in detail now.

When a lower end of the ascending/descending member 103 reaches its descending-limit position, i.e., the upper face of the continuously extruded flat substrate 11 and entire openings of the engaging-element-molding portions 102a are closed, and the ascending/descending member 103 starts to ascend, the openings of the engaging-element-molding portions 102a gradually open upward from their lower ends. At this time, the molten resin is continuously extruded in accordance with opening degree of the openings of the engaging-element-molding portions 102a made by the ascending and descending movement of the ascending/descending member 103. When the ascending/descending member 103 reaches upper ends of the openings at last, substantially first halves of the engaging elements 12 in a extruding direction are molded. Then, the ascending/descending member 103 starts to descend to close the openings of the engaging-element-molding portions 102a gradually from their upper ends, and the second halves of the engaging elements 12 in the extruding direction are molded gradually from the top portions of the engaging heads 14 to the rising base ends of the stems 13, reversely to the above molding of the first halves.

Figure 8:
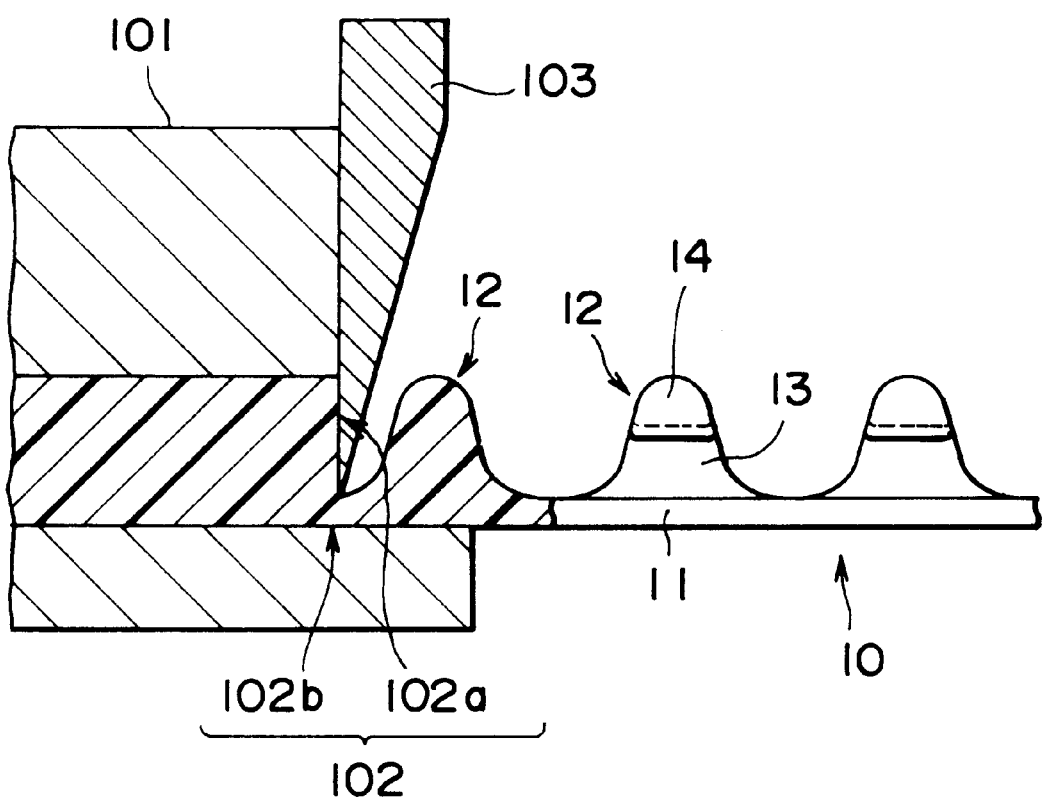
FIG. 8 is a side view of a molding mechanism, partly broken, of the surface fastener according to the apparatus of the invention.

By the above molding mechanism, the front shape of each engaging element 12 substantially conforms to the opening shape of each of the engaging-element -molding portions 102a. However, a shape of the side faces of each engaging element 12 is determined by an ascending/descending speed of the ascending/descending member 103. As shown in FIG. 8, with any speed, the side face of the engaging element 12 has such a shape that its width in the molding direction increases from an upper end toward a lower end of the engaging element 12. Furthermore, by changing and controlling a curve of the ascending/descending speed of the ascending/descending member 103, front and rear curved faces of the engaging element 12 formed by the increasing width of the side faces of the engaging element in the molding direction can be changed in various manners.

Thus, every time the ascending/descending member 104 repeats its ascending and descending movement, a vertical line of a plurality of engaging elements 12 and the substrate 11 are molded simultaneously, and the molded surface fastener 10 as shown in FIG. 1 is continuously molded, which comprises the substrate 11 with a desired length and the lines of desired number of engaging elements 12 disposed in parallel to each other with a predetermined pitch in the molding direction is successively molded. The molded surface fastener 10 extruded from the extruding nozzle 101 and continuously molded is cooled by cooling air or cooling water and sent to the next step or sent to a winding portion through a feed roller, though these succeeding steps are omitted in the drawings.

Figure 9:
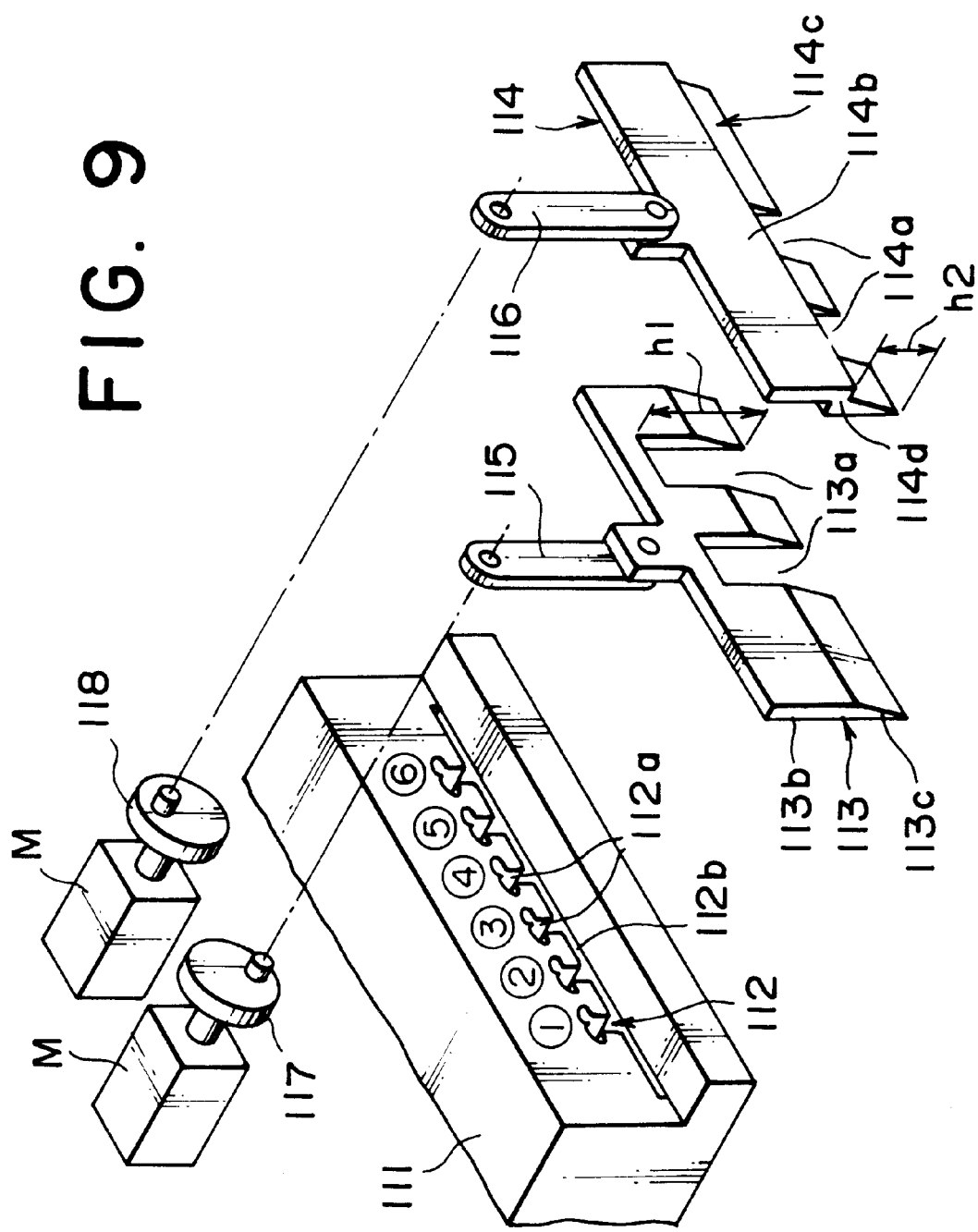
FIG. 9 is an exploded perspective view of an essential portion of a second embodiment of the molding apparatus of the surface fastener according to the invention.
Figure 10:
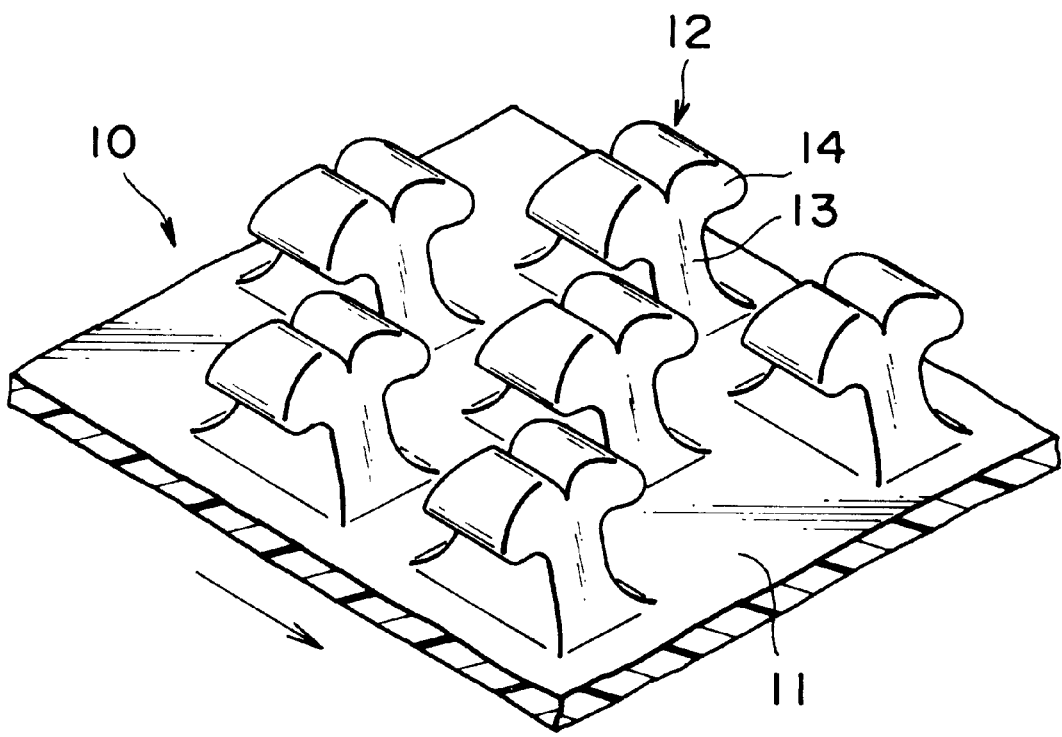
FIG. 10 is a fragmentary perspective view of the surface fastener molded by the apparatus of the second embodiment of the invention.

FIG. 9 shows a second embodiment of the molding apparatus of the molded surface fastener according to the present invention. FIG. 10 is a fragmentary perspective view of a portion of the surface fastener showing an example of arrangement of the engaging elements 12 molded by the molding apparatus.

As shown in FIG. 9, the present embodiment comprises an extruding nozzle 111 having a similar structure to that of the above first embodiment, a front and rear pair of first and second ascending/descending member 113, 114 disposed in front of the extruding nozzle 111, and crank mechanisms 117 and 118 which are connected through links 115 and 116 to the ascending/descending members 113 and 114, respectively, and ascend and descend the first and second ascending/descending members 113 and 114. Other structures are similar to those in the apparatus of the above first embodiment.

According to the present embodiment, similarly to the apparatus of the above first embodiment, the extruding hole 112 of the extruding nozzle 111 comprises a plurality of engaging-element-molding portions 112a and the substrate-molding portion 112b with which the lower ends of the engaging-element-molding portions 112a communicate. A total number of the engaging-element-molding portions 112a is six as designated by reference numerals ① to ⑥. On the other hand, the first and second ascending/descending members 113 and 114 are respectively made of pectinate metal planks each having two vertically long rectangular slits 113a and 114a.

Each of the rectangular slits 113a of the first ascending/descending member 113 basically have a width equal to that of the rectangular slits 114a of the second ascending/descending member 114 and is disposed with an interval which is equal to that of the slits 114a. However, an entire shape of the first ascending/descending member 113 is different from that of the second ascending/descending member 114.

Specifically, an upper half portion 113b of the first ascending/descending member 113 has a flat face with a substantially constant thickness, and a lower half portion 113c of the first ascending/descending member 113 is formed into a wedge-like sectional shape similarly to the above first embodiment. A height hi of the rectangular slits 113a is so large that the slits 113a extend up to near an upper end of the upper half portion 113b with the constant thickness.

On the other hand, the second ascending/descending member 114 comprises a constant thickness portion 114b and a wedge-shaped sectional portion 114c having a wedge-shaped sectional similar to that of the apparatus of the above first embodiment, the constant thickness portion 114b being connected to the wedge-shaped sectional portion 114c by a step through a connecting portion 114d projecting from a lower end of the constant thickness portion 114b in a direction reverse to the molding direction. The rectangular slits 114a of the second ascending/descending member 114 are formed to reach an upper end of the wedge-shaped sectional portion 114c. A height h2 of the wedge-shaped portion 114c is set at such a value that the wedge-shaped portion 114c can be fitted into and can ascend and descend inside the rectangular slits 113a of the first ascending/descending member 113 to allow the engaging elements 12 to be formed of the molten resin extruded from the engaging-element-molding portions 112a.

The rectangular slits 113a and 114a of the first and second ascending/descending members 113 and 114 are formed to be displaced with each other in left or right directions of the first and second ascending/descending members 113 and 114 such that one do not overlap the other. The first ascending/descending member 113 is disposed to be displaced by a pitch of each of the rectangular slits 113a and 114a relative to the second ascending/descending member 114, to that the wedge-shaped sectional portion 114c of the second ascending/descending member 114 is fitted into the rectangular slits 113a from the front of the first ascending/descending member 113.

The first and second ascending/descending members 113 and 114 ascend and descend in contact with the extruding hole 112 of the extruding nozzle 111 by activating the crank mechanisms 117 and 118 for ascending and descending the first and second ascending/descending members 113 and 114 connected to the crank mechanisms 117 and 118 through the links 115 and 116. At. this time, the first and second ascending/descending members 113 and 114 are alternately driven such that after one of the ascending/descending members completes its ascending and descending, the other ascends and descends. For example, when the first ascending/descending member 113 reaches a descending-limit position, the wedge-shaped sectional portion 114c of the second ascending/descending member 114 starts to descend inside the rectangular slits 113a of the first ascending/descending member 113.

In the example shown in FIG. 9, three lines of engaging elements 12 are molded from the molten resin extruded from the odd-numbered engaging-element-molding portions 112a ①, ③, and ⑤ counted from the left across the engaging-element-molding portions 112a ① to ⑥ of the extruding nozzle 111 by using the first ascending/descending member 113, which three lines of engaging elements 12 are formed from the molten resin extruded from the even-numbered engaging-element-molding portions 112a ②, ④, and ⑥ counted from the left by using the second ascending/descending member 114. The molding mechanism is the same as that of the apparatus of the above first embodiment. The surface fastener thus molded comprises a large number of engaging elements 12 arranged in a staggered manner and standing integrally with the surface of the flat substrate 11. A shape of each the engaging element 12 according to this embodiment is the same as that shown in FIG. 1.

Figure 11:
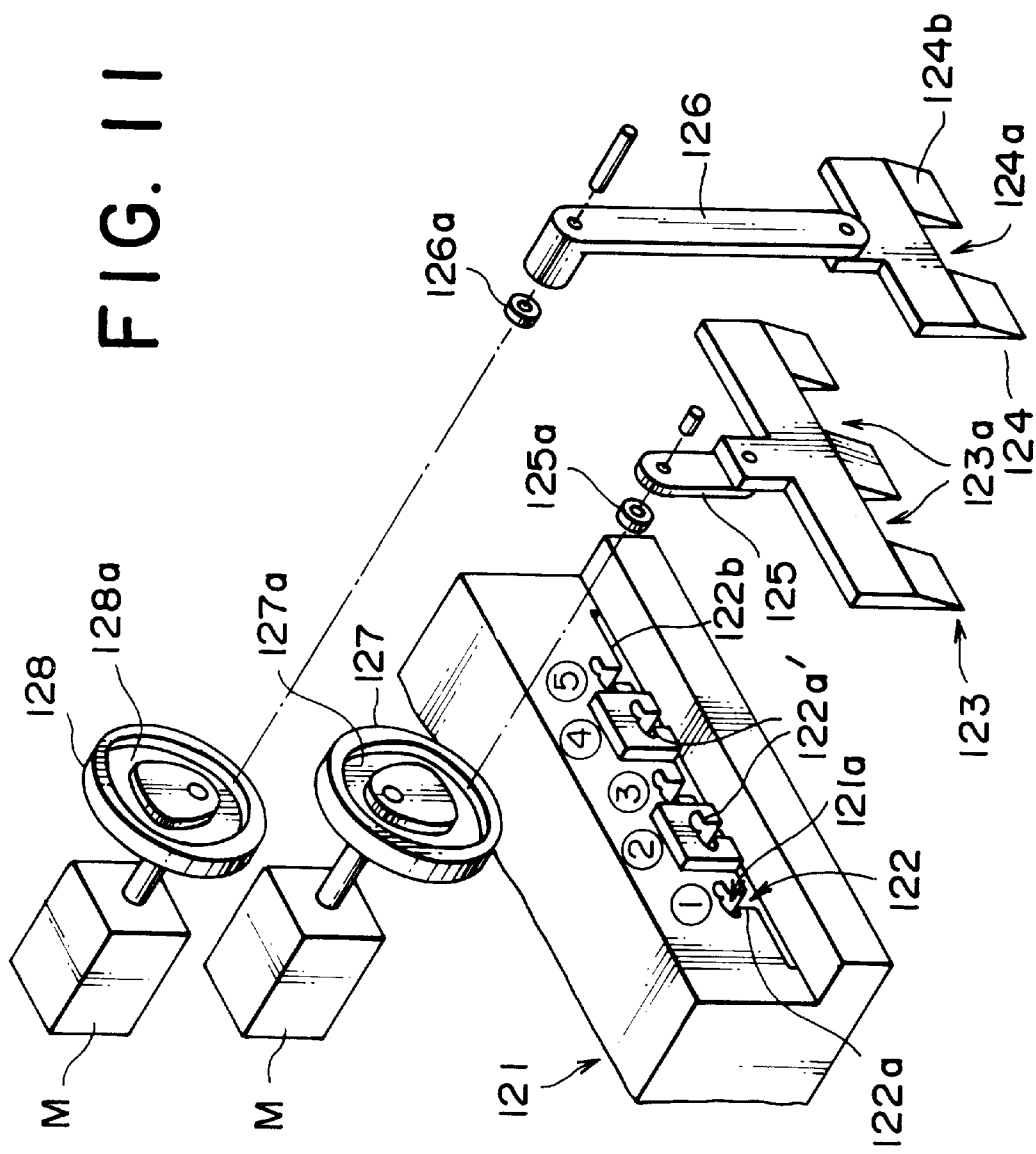
FIG. 11 is an exploded perspective view of an essential portion of a third embodiment of the molding apparatus of the surface fastener according to the invention.

FIG. 11 shows a third embodiment of the molding apparatus of the molded surface fastener. By using this apparatus of the present embodiment, the surface fastener having the engaging elements 12 disposed in a staggered manner as shown in FIG. 10 can be molded. The apparatus of the present embodiment is different from the apparatus of the above second embodiment in structures of the extruding hole 122 of the extruding nozzle 121, the first ascending/descending member 123, the second ascending/descending member 124, the first link 125, the second link 126, and activating means 127 and 128 for the ascending/descending members 123 and 124.

The extruding nozzle 121 has a vertical face 121a similar to the vertical face 101a of the apparatus of the above first embodiment. Out of a plurality of (five in the example shown in FIG. 11) engaging-element-molding portions 122a of the extruding hole 122 defined in the vertical face 121a, the second and fourth engaging-element-molding portions 122a' ② and ④ are formed to project forward by a thickness equal to that of the first ascending/descending member 123. The first ascending/descending member 123 has a lower half portion in a wedge-like sectional shape made of the pectinate metal plank including two rectangular slits 123a for sliding with and for being fitted on the engaging-element-molding portions 122a' so as to be slidable on the outer side surfaces of the projecting engaging-element-molding portions. The second ascending/descending member 124 also has a lower half portion made of the metal plank comprising left and right wedge-shaped sectional portions 124b disposed to face the rectangular slits 123a and a rectangular slit 124a formed between the sectional wedge-shaped portions 124b.

One ends of the first link 125 and the second link 126 are pivotally mounted to the first and second ascending/descending members 123 and 124, respectively. Mounted to the other ends of the first and second links 125 and 126 are rolling members 125a and 126a respectively rolling along ring-shaped cam grooves 127a and 128a of first and second rotating cams 127 and 128 mounted to respective output shafts of electric motors M which are activating means for the first and second ascending/descending members 123 and 124.

In order to mold the surface fastener as shown in FIG. 10 with the above members, the two rectangular slits 123a of the first ascending/descending member 123 are disposed to be fitted on the engaging-element-molding portions 122a' projecting forward from the extruding nozzle 121 so as to be in sliding contact with the left and right side faces thereof, and the left and right wedge-shaped sectional portions 124b of the second ascending/descending member 124 are disposed to be in sliding contact with front faces of the engaging-element-molding portions 122a'. The first and second ascending/descending members 123 and 124 alternately ascend and descend in response to rotations of the first and second rotating cams 127 and 128, thereby continuously molding the surface fastener having a large number of engaging elements 12 disposed in a staggered manner on the surface of the flat substrate 11, as shown in FIG. 10.

Figure 12:
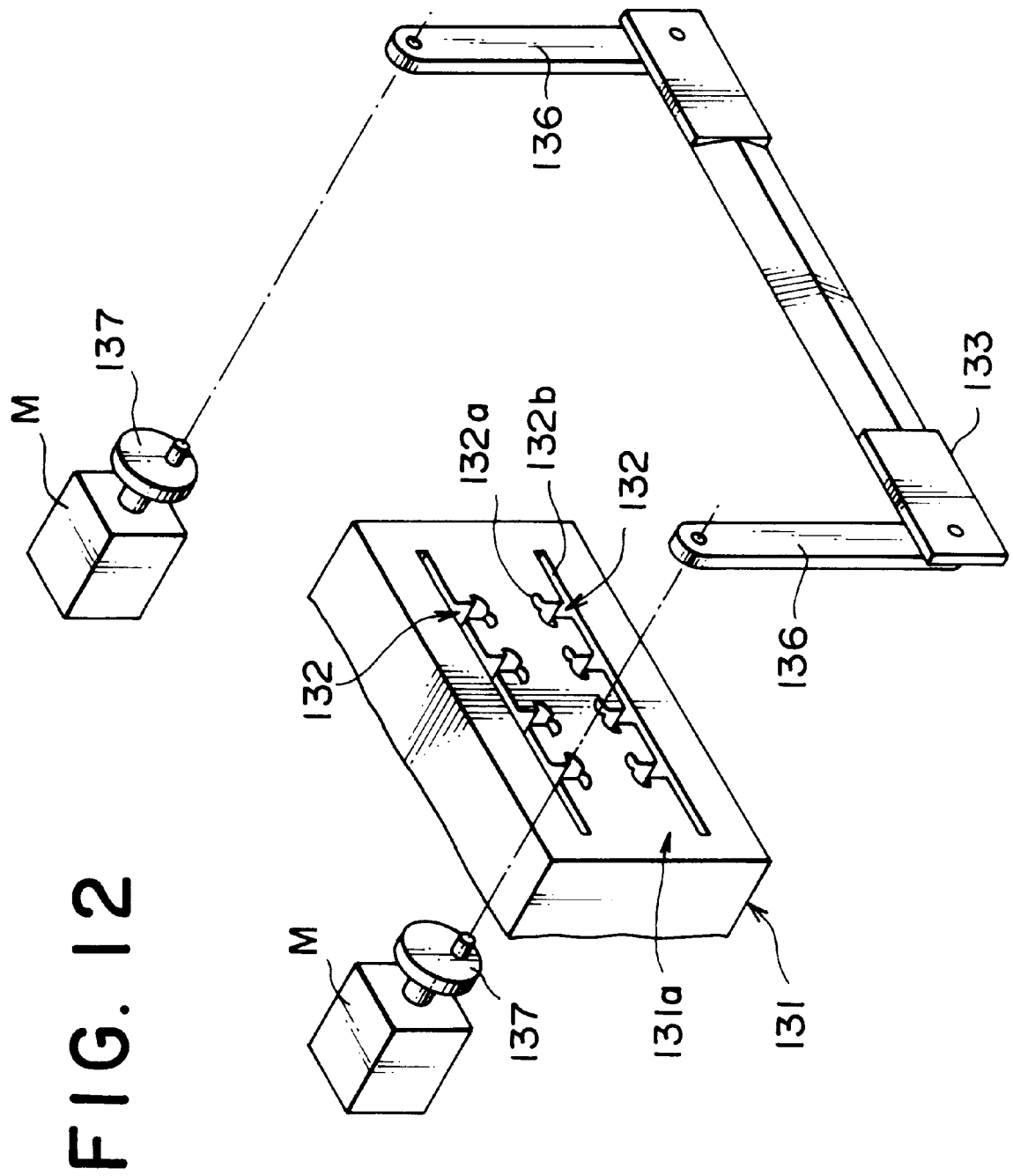
FIG. 12 is an exploded perspective view of an essential portion of a fourth embodiment of the molding apparatus of the surface fastener according to the invention.

FIG. 12 shows a fourth embodiment of the continuously molding apparatus for continuously molding the surface fastener according to the present invention. According to the present embodiment, the extruding nozzle 131 has a pair of extruding holes 132, 132 formed separately from each other at an upper portion and a lower portion of a vertical plane 131a respectively. The pair of upper and lower extruding holes 132, 132 have symmetric shapes with respect to a center line between the holes 132, 132. The extruding holes 132, 132 are connected to a single molten-resin-supply channel (not shown) formed inside the extruding nozzle 131. A shape of each the extruding hole 132 is the same as that of the extruding hole of the apparatus of the above first embodiment.

On the other hand, the ascending/descending member 133 of the present embodiment comprises a single metal plank in a shape of an isosceles triangle in section. Crank shafts 137 driven by a pair of left and right electric motors M, M are respectively connected to left and right opposite ends of the ascending/descending member 133 through links 136. The ascending/descending member 133 is disposed such that the member 133 is in contact with the extruding holes 132 at a flat face side of the ascending/descending member 133. The molten resin is supplied to the extruding nozzle 131 from the extruder (not shown) and the electric motors M, M are driven to cause the ascending/descending member 133 to slide upward and downward through the links 136, thereby continuously molding two upper and lower surface fasteners. The molding mechanism is the same as that of the above first embodiment. However, the ascending/descending member 133 ascends and descends between a boundary of the upper engaging-element-molding portion 132a and the corresponding substrate-molding portion 132b and a boundary of the lower engaging-element-molding portion 132a and the corresponding substrate-molding portion 132b.

According to the present embodiment, a productivity doubles. In the above embodiments, there is a tendency for the molten resin of an amount larger than a set value to be extruded at a moment when the ascending/descending member starts to open the extruding hole and when a pressure of the resin at the extruding hole is high, which influences on a shape of a front face of each molded engaging element 12. In the present embodiment, however, when the upper or lower engaging-element-molding portion 132a starts to open, the other engaging-element-molding portion 132a starts to close. Therefore, an opening rate of the extruding holes 132 is constant, the resin pressure in the molten-resin-supply channel is always maintained at a constant value, and the shapes of front and rear portions of the engaging element 12 can be inserted.

In order to mold the surface fastener having a substrate structure shown in FIG. 5, the descending-limit position of the ascending/descending member is not set at the boundary between the engaging-element-molding portions and the substrate-molding portion but is set at a midway portion of the stem molding portions of the engaging-element-molding portions. In contrast, by lowering the descending-limit position of the ascending/descending member to a midway position of the substrate-molding portion which is lower than the boundary between the engaging-element-molding portion and the substrate-molding portion, the surface fastener having the substrate structure shown in FIG. 6 can be molded.

As can be understood from the above description, the engaging elements 12 of the molded surface fastener according to the present invention can be individually molded on the flat substrate 11. In the conventional molded surface fastener, a large number of lines of ribs each having a shape of the engaging element in section are extrusion molded together with the substrate to extend on the substrate, and then the ribs are cut with a predetermined pitch in a longitudinal direction, and finally the substrate is drawn to separate the engaging elements from each other. Compared with such conventional molded fasteners, a touch of the fastener of the present invention is excellent, and various arrangements of the engaging elements or various shapes of the engaging elements 12 on a single substrate can be obtained. Particularly, according to the present invention, because at least a width of each engaging element 12, which is in a direction perpendicular to a projecting direction of the engaging head 14, gradually increases from a top portion of the engaging head 14 to the rising base end of the stem 13, the engaging elements can be prevented from falling and the peeling force and the engaging force can be increased due to such a peculiar shape of each engaging elements 12.

Also, because the surface fastener of the present invention with the above shape can be continuously molded by a single step by using the molding process and the molding apparatus of the molded surface fastener according to the invention, efficiency can be remarkably increased and a size of a space required for equipment can be decreased, as compared with the above-mentioned conventional process and apparatus. Particularly, because the apparatus of the present invention can be obtained by providing a slight improvement to the conventional molding apparatus of the same type, cost of equipment can be decreased.

What is claimed:

1. A molded surface fastener comprising a flat substrate and a large number of engaging elements integrally molded with the flat substrate, wherein each of the engaging elements has a stem standing on a surface of the flat substrate and an engaging head projecting from an end of the stem toward at least one side thereof, and a thickness of each of the engaging elements in a direction perpendicular to a projecting direction of the engaging head gradually increasing from a top of the engaging head to a base end of the stem, wherein the engaging head projects only in a direction perpendicular to a molding direction of the molded surface fastener.

2. A molded surface fastener according to claim 1, wherein an end of the engaging head faces a surface of the flat substrate.

3. A molded surface fastener according to claim 1, wherein a large number of the engaging elements are disposed in a large number of lines in a molding direction of the substrate, and the engaging elements adjacent across the lines are disposed in a staggered manner.

4. A molded surface fastener comprising a flat substrate and a large number of engaging elements integrally molded with the flat substrate, wherein each of the engaging elements has a stem standing on a surface of the flat substrate and an engaging head projecting from an end of the stem toward at least one side thereof, and a thickness of each of the engaging elements in a direction perpendicular to a projecting direction of the engaging head gradually increasing from a top of the engaging head to a base end of the stem and wherein the flat substrate has a recessed groove which extends continuously in a direction perpendicular to a projecting direction of the engaging head between the engaging elements which are adjacent to each other in the projecting direction of the engaging head between the engaging elements which are adjacent to each other in the projecting direction of the engaging head.

5. A molded surface fastener comprising a flat substrate and a large number of engaging elements integrally molded with the flat substrate, wherein each of the engaging elements has a stem standing on a surface of the flat substrate and an engaging head projecting from an end of the stem toward at least one side thereof, and a thickness of each of the engaging elements in a direction perpendicular to a projecting direction of the engaging head gradually increasingly from a top of the engaging head to a base end of the stem and wherein the flat substrate has a recessed groove which extends continuously in a projecting direction of the engaging head between the engaging elements which are adjacent to each other in a direction perpendicular to the projecting direction of the engaging head.

\* \* \* \* \*